United States Patent [19]

Hirsch et al.

[11] 4,206,777

[45] Jun. 10, 1980

[54] VACUUM BREAKER VALVE AND STEM PACKING ASSEMBLY

[76] Inventors: Elder F. Hirsch, 520 21st St.; Ronald F. Hirsch, 707 E. 20th St., both of Greeley, Colo. 80631

[21] Appl. No.: 641,074

[22] Filed: Dec. 15, 1975

[51] Int. Cl.² ............................................. F16K 24/02
[52] U.S. Cl. .................................. 137/218; 137/360; 137/528
[58] Field of Search ......... 137/218, 523, 101, DIG. 2, 137/301, 360, 528; 251/82, 83, 85

[56] References Cited

U.S. PATENT DOCUMENTS

| | | | |
|---|---|---|---|
| 2,159,056 | 5/1939 | Sloan | 137/218 |
| 3,023,767 | 3/1962 | Woodford | 137/218 |
| 3,106,935 | 10/1963 | Gatzke | 137/218 |
| 3,286,722 | 11/1966 | Royer | 137/218 |
| 3,297,046 | 1/1967 | Hall | 137/218 |
| 3,929,150 | 12/1975 | Flinner et al. | 137/218 |

*Primary Examiner*—Gerald A. Michalsky
*Attorney, Agent, or Firm*—Max L. Wymore

[57] ABSTRACT

Sill cock having novel vacuum breaking stem packing assembly to break vacuum between the shutoff valve and the cock and a vacuum breaker shut off valve to close same upon encountering a vacuum or reduced pressure in the main.

6 Claims, 9 Drawing Figures

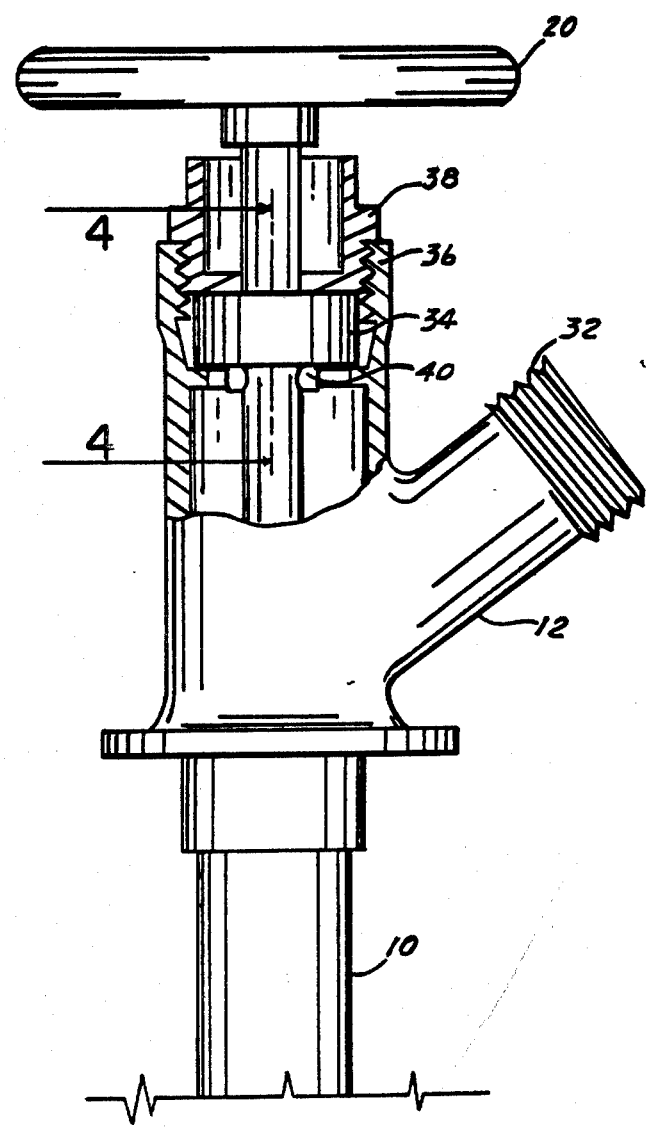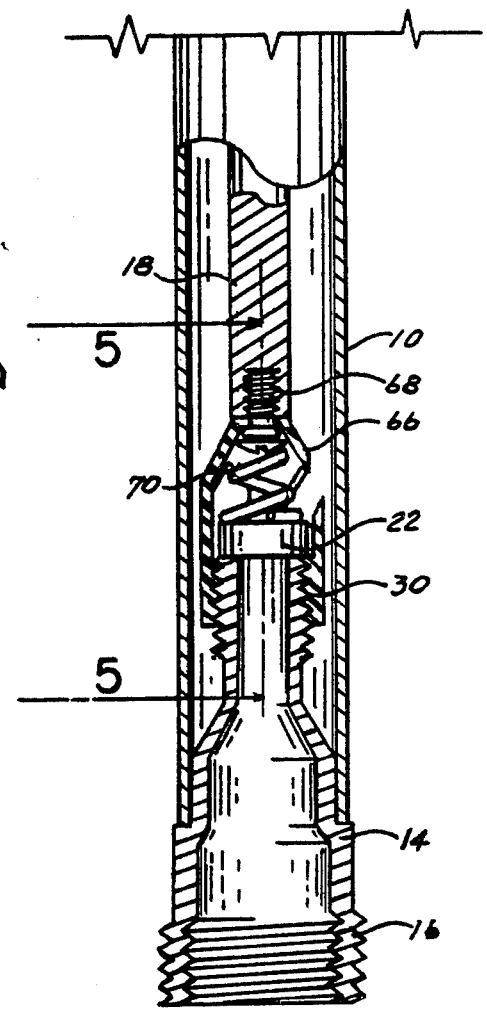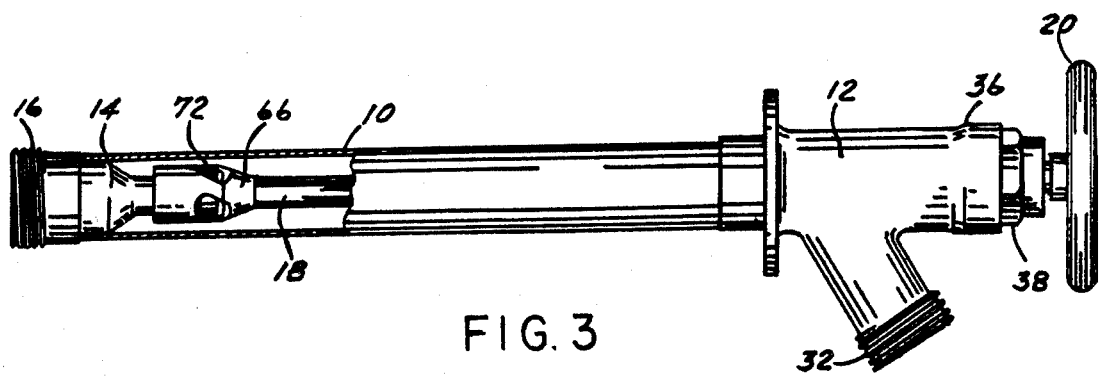
FIG.1
FIG.2
FIG.3

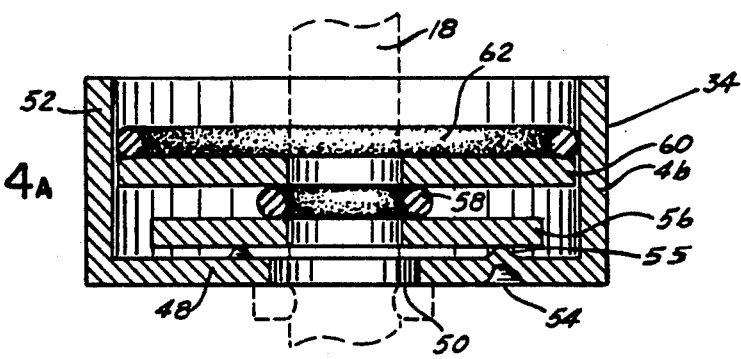
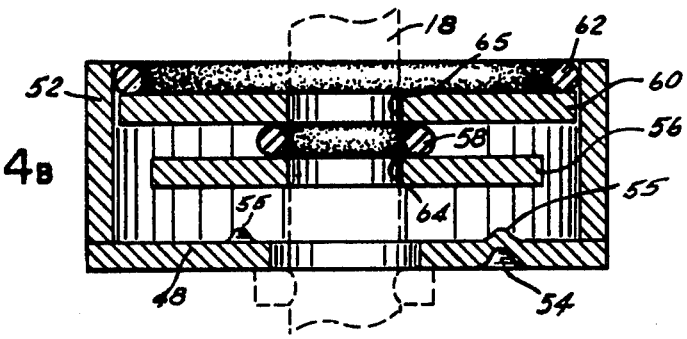
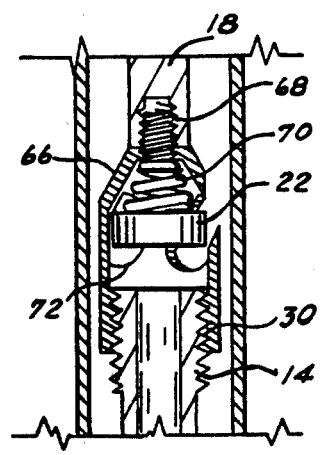 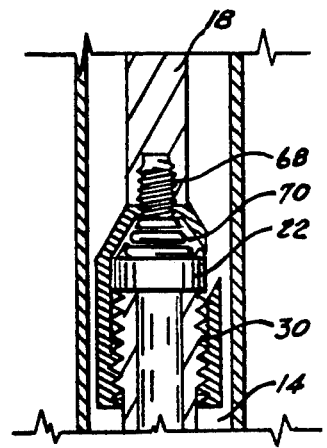

VACUUM BREAKER VALVE AND STEM PACKING ASSEMBLY

This invention is directed to a sill cock of the no-freeze type where the shut off portion of the valve is positioned on the interior of a building to prevent freezing of the valve and the operating handle is positioned on the exterior of the building. This is arranged such that when the valve is closed, the water will drain from the exterior portion of the cock to avoid freezing of the water. For the water to drain from the exterior portion of the cock, air must be permitted to enter the cock to replace the water. Where a hose is connected to the cock this may prevent the flow of air into the cock and a partial vacuum will be formed therein and acts to prevent escape of the water that can freeze and cause damage to the cock.

Also in an arrangement like this where the cut off valve is open and a hose is connected to the cock, if water is being pumped from the main, such as a fire engine pumping water from a nearby fire hydrant, a vaccum will of times be pulled on the main causing water in the hose to be drawn ino the main or, at least, the residential water system.

It is a principle object of the present invention to provide means for automatically breaking the vacuum in the exterior of a sill cock to allow same to drain freely and prevent freezing.

Another object of the invention is to provide means for automatically closing the shut off valve whenever a partial vacuum is caused to exist in the mains to prevent siphoning of contaminated water into the water supply.

Another object of the invention is to provide a vacuum breaking valve stem packing that can be installed in an existing sill cock without modification or requiring special tools.

Another object of the invention is to provide a combination vacuum breaking shut off valve, valve stem and packing that can be installed in a conventional sill cock with out modification to prevent freeze up and siphoning of contaminated water into the water system.

Another object of the invention is to provide a vacuum breaker valve and stem packing assembly whose construction is designed for simplicity, economy and efficiency.

For a better understanding of the present invention, together with other and further objects thereof, references is had to the following description taken with the drawings and its scope will be pointed out in the appended claims.

IN THE DRAWING

FIG. 1 is a side elevation of a sill cock according to the invention with a portion broken away to show the interior construction and partly broken to conserve space;

FIG. 2 is a side elevation of the shut-off valve portion of a sill cock according to the invention with a portion broken away to show the inner construction of the valve and partly borken to conserve space.

FIG. 3 is a side elevation of a modified anti-freeze sill cock with a portion broken away to show the shut-off valve according to the invention.

FIG. 4A is a cross sectional view along line 4—4 of FIG. 1 showing the valve stem packing assembly of the invention in vacuum releasing position.

FIG. 4B is a cross-sectional view along line 4—4 of FIG. 1 showing the valve stem packing assembly of the invention in sealing position.

FIG. 5A is a cross-sectional view along line 5—5 of FIG. 2 showing the shut-off valve in open position and water flowing.

FIG. 5B is a cross-sectional view along line 5—5 of FIG. 2 with the shut-off valve in closed position. In FIG. 2 the shut-off valve is shown in normally open position with no water pressure on the valve.

Figure 6:
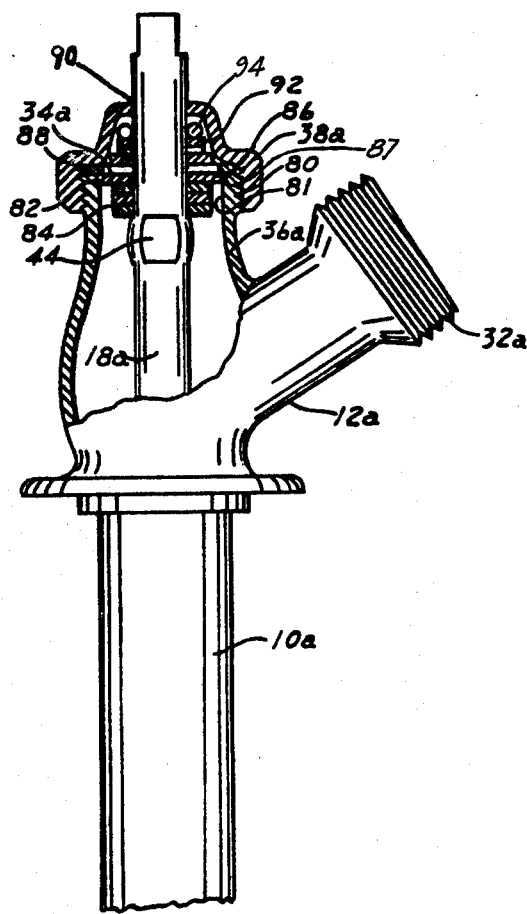
FIG. 6 is a side elevation of another embodiment of a sill cock according to the present invention with portions broken away to show the interior construction and partly broken to conserve space.

The present invention is designed to incorporate elements of a conventional sill cock. These elements comprise a wall tube 10 normally positioned through the wall of a buildings. The cock housing 12 is mounted on one end of the tube and positioned to be exterior of the building. At the opposite end of the tube there is mounted a valve housing 14 mounted on the interior extremity of the tube and is provided with threads 16 for connection to a water supply. A valve stem 18 extends axially through the interior of the tube and terminates at its outer extremity in a hand wheel 20. The other extremity is provided with a shut-off valve 22 according to the present invention as will be explained presently. The valve is provided with conventional valve actuating threads 30 for closure of the valve by means of the hand wheel.

The cock housing is normally provided with a hose spout 32 having exterior threads adapted to receive a hose coupling. As in the conventional sill cock when the hand wheel 20 is rotated clockwise, the valve 22 is forced against the valve seat of the valve housing 14 to shut off the water supply. When the valve is closed water remaining in the tube and housing should drain but if a hose is connected, the water therein may prevent air from entering the housing and tube such that the water remains and is subject to freezing with resultant damage.

To avoid retention of water in the housing according to the present invention there is provided vacuum valve means 34 replacing the usual valve stem packing which is adapted to admit air to the housing to break a vacuum and release any water therefrom.

The vacuum valve means 34 is positioned on the valve stem 18 in housing 12 within the valve stem neck 36. A body member 38 is threaded into the internal threads of the neck 36. The valve stem 18 is provided with a stop means 40 which may be a pin 42 pressed through a hole in the stem as shown in FIG. 1 or an up-set portion 44 of the stem as shown in FIG. 6. In either version the stop means 40 serves to limit the inward positioning of the vacuum valve means 34 on the valve stem 18.

Referring now to FIGS. 4A and 4B, it is seen that one form of the vacuum valve means 34 for use in the sill cock arrangement of FIGS. 1 and 2, wherein valve stem receiving outer end of the cock housing 12 is provided with internal threads, comprises a cup shaped element 46 with a bottom 48 having an opening 50 therein somewhat larger than and receiving the valve stem 18. The element 46 has a peripheral upstanding wall portion 52 which may be connected to bottom 48 as a unitary structure or the bottom may be in the form of a flat washer and the walls formed by a separate length of tubing as depicted in FIG. 4B. The bottom 48 and walls 52 are sized to just be received within the threaded opening of neck 36 of the cock housing 12. Bottom 48 is also provided with a plurality of indentations 54 that provide for proturberences 55 on the inside of the bottom of the cup shaped element 46. Within the walls of the cup element are provided in ascending order from the bottom, a washer 56, an O-ring 58, washer 60, and an O-ring 62. The washer 56 has a center hole 64 providing for a sliding fit on the valve stem 18 and has an outer diameter of a dimension at least sufficient to engage the proturberences 55 of the indentations 54. The proturberences 55 are for the purpose of preventing the washer 56 from seating in sealing relation with the bottom of the cup element. Other means may be provided to accomplish the same result such as protuberences on the bottom of the washer and the like. The O-ring 58 is sized to provide a near sealing fit about the valve stem but still permit sliding movement of the O-ring there along. Washer 60 is provided with a center hole sized to provide a sliding fit on the valve stem and an outer diameter nearly as large as the inside diameter of the walls 52 of the up element 46. The O-ring 62 is of a size to provide a sealing fit with the walls 52 of the cup element but still permit sliding movement there along.

The embodiment of the vacuum release of FIGS. 1, 4A and 4B operates as follows. When the handwheel 20 is turned counterclockwise, valve 22 is opened as in FIG. 5A and water from the supply enters tube 10 and is discharged from sill cock 12. Since the water is under pressure, usually from 10 to 60 psi, water will pass through the space between the valve stem 18 and the edges of hole 50 in the bottom of cup element 48 and the force applied to the bottom of washer 56 will cause the washer 56 and O-ring 58, washer 60 and O-ring 62 to move upwardly in the drawings FIGS. 1, and 4A, to the position shown in FIG. 4B. The O-ring 62 is forced against the face of body member 38 by washer 60 and provides a seal therebetween preventing the escape of water. When the handwheel 20 is turned clockwise and a vacuum is produced in sill cock 12 and tube 10, the vacuum will cause, O-ring 62, washer 60, O-ring 58 and washer 56 to be moved in a downwardly direction toward the position drawn in FIG. 4A and the vacuum will be broken by the entry of air between the O-ring 62 and washer 60, past O-ring 58, washer 56 and through the hole 50 in the bottom 48 of the cup shaped element to allow escape of any water that would be retained in the sill cock and tube.

Referring now to FIGS. 2, 5A and 5B, there is shown a shut-off valve 13 of the sill cock incorporating the improved arrangement according to this invention. A valve cage 66 is secured to the end of the valve stem 18 opposite the handwheel by means of a screw 68 which also secures spring 70 supporting the valve closure 22. Valve cage 66 is provided with plurality of openings 72 for escape of water when the valve 22 is out of engagement with valve seat 74 at the inner end of valve housing 14. The valve cage 66 is provided with activating threads 30 and the inner end of valve housing 14 is provided with mating threads. The shut-off valve is shown in the closed position in FIG. 5B as by the turning of the handwheel 20 in a clockwise direction. In FIG. 5A, the shut-off valve is in the open position with water pressure assisting in holding the valve 22 open against the bias of spring 70. In FIG. 2 the valve is in the normal open position depicted in FIG. 5A, however, the water pressure in the main is near zero or at a vacuum. This condition can occur where a pumper may be pumping water from a nearby fire hydrant. When a vacuum occurs in the supply line, the spring 70 biases the valve 22 into the water supply lines of the building or residence and possibly into the mains which would result in the contamination of the supply.

Figure 7:
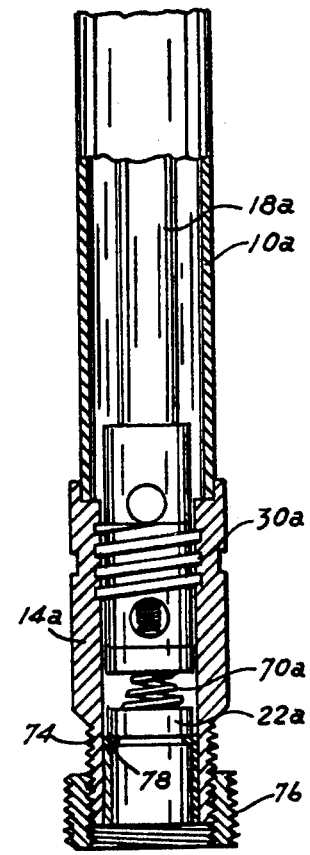
FIG. 7 is a side elevation of the shut-off valve portion of a sill cock according to the present invention with a portion broken away to show inner construction and partly broken to conserve space.

Referring now to FIGS. 6 and 7, there is shown another embodiment of the present invention. The corresponding parts of the embodiment of FIGS. 1 through 5 are given the same reference numeral with a subscript. Again the sill cock is seen to comprise a wall tube 10a to extend through a wall of a building. The cock housing 12a is mounted on the exterior end of the tube. A valve housing 14a is mounted at the opposite end of the tube and provided with threads 16a to connect to a water supply. A valve stem 18a is axially positioned within the tube to extend from the valve housing to a point exterior of the cock housing where it is adapted to be fitted to a handwheel 20a. The other end of the valve stem is provided with a shut-off valve 22a secured thereto with a spring 70a to provide for axial movement of the valve 22a with respect to the valve stem against the bias of the spring. The spring 70a may conveniently be a helical spring that collapses within itself on being compressed. The valve is provided with conventional valve actuating threads 30a for closure of the valve by means of a handwheel. The valve housing 14a is provided with internal mating theads that mate with threads 30 of the valve. At the outer extremity, valve housing 14a is provided with external threads 74. A threaded collar 76 having both internal and exterior threads is threaded to threads 74 and a valve seat 78 is secured to collar 76 and positioned within the valve housing 14a to receive the valve 22a in sealing relation. The external or internal threads of collar 76 are adapted to threadedly receive the mating threads of a water supply line. Valve 22a is shown in the open position but with zero or negative water pressure in the line such that valve 22a is biased closed by the spring 70a to prevent syphoning of contaminated water into the supply line.

Referring now to FIG. 6 in particular, the cock housing 12a has an opening 81 through which the valve stem extends and external threads 80 are provided to receive a valve stem bushing 38a in threaded relation. A shoulder 87 is provided at the inside outward extremity to normally receive the valve stem packing. According to the present invention, a spacer 84 or a series of spacers, normally metal, are positioned above the stop means 44 to support a washer 86 of a size to be received in contact within the shoulder 82. A sealing washer 88, which may be a fiber washer is received within the bushing 38a and is squeezed in sealing relation between the bushing 38a and the end of the opening of cock housing 12a. The bushing 38a is provided with an opening 90 through which the valve stem extends and the space within the bushing between washer 86 and opening 90 is occupied by a spacer 92 which may be a plurality of washers and an O-ring 94 sized to slidably receive the valve stem is positioned thereon between the spacer 92 and the opening 90 of the bushing 38a. Thus when water pressure is present within the cock housing, the spacer 92 will cause O-ring 94 to seal the opening 90 but when a vacuum is created within the cock housing the O-ring 94 and the spacer 92 is permitted to unseal the opening 90 and relieve the vacuum.

Thus it is seen that applicants invention solves both the problem of breaking a vacuum within the cock housing to allow water to escape and avoid freezing problems and further to close the shut-off valve whenever a near zero or negative pressure occurs in the supply line.

What is claimed is:

1. In a sill cock comprising an external cock housing; an internal supply shut-off valve, a wall tube connecting said housing to said valve; a valve stem extending from said valve outwardly through said housing; and a body member having an opening receiving the stem threadably secured to the cock housing in water tight relation the improvement comprising stop means positioned on said valve stem within the cock housing, a one way valve means positioned on said valve stem against said stop adapted to selectively seal the opening between the stem and the body member when a positive pressure is present within the cock housing and to unseal the opening between the stem and the body member when a negative pressure is present in the cock housing, wherein the one-way valve means comprises a cup-shaped member having a bottom and upstanding walls, with the bottom having an opening therein receiving the valve stem, a first washer within the cup-shaped element having a center opening sized to receive the valve stem in sliding relation, a first O-ring positioned adjacent the first washer of a size to provide a seal between the first washer and the valve stem, a second washer adjacent the first O-ring having a center opening receiving the valve stem in sliding relation and having an outside diameter only slightly less than the inside diameter of the upstanding walls of the cup-shaped member and a second O-ring adjacent the second washer having an outside diameter to just fit within the upstanding walls of the cup-shaped member wherein water pressure within the cock housing causes said first washer, first O-ring, second washer, and second O-ring to be moved away from the bottom of the cup-shaped element and force the second O-ring into sealing relation between the second washer, the upstanding walls of the cup-shaped element and the body member and to force the first O-ring into sealing relation between the first washer and the valve stem and the valve stem and the second washer.

2. The invention according to claim 1 wherein the improvement further includes resilient means interconnecting the valve stem and the shut-off valve adapted to bias the shut-off valve closed which has been opened under normal water supply water pressure, in the absence of water pressure in the cock housing.

3. The invention according to claim 1 wherein means are provided on the interior of the bottom of the cup-shaped member to prevent the first washer from assuming a sealing relation with the bottom.

4. The invention according to claim 1 wherein the cup-shaped member is comprised of a flat washer for a bottom and the upstanding walls are formed by a length of tubing.

5. The invention according to claim 1, wherein the cup-shaped member bottom and upstanding walls comprise separate pieces.

6. A one-way valve means to provide a one-way seal between the valve stem and the sill cock housing of a sill cock which comprises a cup-shaped member having a bottom and upstanding walls, with the bottom having an opening therein adapted to receive the valve stem, a first washer within the cup-shaped element having a center opening sized to receive the valve stem in sliding relation, a first O-ring positioned adjacent the first washer of a size to provide a seal between the first washer and the valve stem, a second washer adjacent the first O-ring having a center opening receiving the valve stem in sliding relation and having an outside diameter only slightly less than the inside diameter of the upstanding walls of the cup-shaped member and a second O-ring adjacent the second washer having an outside diameter to just fit within the upstanding walls of the cup-shaped member wherein water pressure within the cock housing will cause said first washer, first O-ring, second washer, and second O-ring to be moved away from the bottom of the cup-shaped element and force the second O-ring into sealing relation between the second washer, the upstanding walls of the cup-shaped element and a body member of the sill cock, having an opening adapted to receive a valve stem and threadably secured to the cock housing in water tight relation, and to force the first O-ring into sealing relation between the first washer and the valve stem and the valve stem and the second washer.

* * * * *